United States Patent [19]
Poris

[11] Patent Number: 5,625,170
[45] Date of Patent: Apr. 29, 1997

[54] PRECISION WEIGHING TO MONITOR THE THICKNESS AND UNIFORMITY OF DEPOSITED OR ETCHED THIN FILM

[75] Inventor: Jaime Poris, Los Gatos, Calif.

[73] Assignee: Nanometrics Incorporated, Sunnyvale, Calif.

[21] Appl. No.: 183,476

[22] Filed: Jan. 18, 1994

[51] Int. Cl.$^6$ .......................... G01G 19/50; G01C 17/38
[52] U.S. Cl. .................. 177/50; 177/1; 73/1.13; 364/571.01
[58] Field of Search ................. 177/1, 50; 73/1 B; 364/571.01, 571.02, 571.03, 571.04, 571.05, 571.06, 571.07, 571.08

[56] References Cited

U.S. PATENT DOCUMENTS

| | | | |
|---|---|---|---|
| 5,058,422 | 10/1991 | Shimauchi | 73/1 B |
| 5,321,634 | 6/1994 | Obata et al. | 73/1 B |
| 5,550,328 | 8/1996 | Freeman et al. | 177/50 |

Primary Examiner—Michael L. Gellner
Assistant Examiner—Randy W. Gibson
Attorney, Agent, or Firm—Michael A. Glenn

[57] ABSTRACT

A time delayed differential weighing procedure used with an electronic analytical balance is optimized for samples exhibiting a small change in mass, for example from deposition, etching, plating or corroding, relative to the sample mass to minimize all significant sources of error that could otherwise degrade the measurement results, such as errors resulting from air density and temperature changes that occur during the interval between the first measurement of a sample, before the sample is processed, and a subsequent measurement of the sample, after the sample is processed. A calibration standard having substantially the same density as that of the sample is weighed both times the sample is weighed, i.e. before and after processing, to track the change in the sample balance reading due to air density and temperature changes, and thereby eliminate sample related errors. Balance and weighing procedure accuracy and precision are tested by a gauge study procedure. A procedure for determining area exposed after photoresist develop on a semiconductor wafer application is also provided.

16 Claims, 4 Drawing Sheets

PRECISION WEIGHING TO MONITOR THE THICKNESS AND UNIFORMITY OF DEPOSITED OR ETCHED THIN FILM

BACKGROUND OF THE INVENTION

1. Technical Field

The invention relates to differential measurement of mass. More particularly, the invention relates to the use of precision weighing to monitor the thickness and uniformity of deposited or etched thin films.

2. Description of the Prior Art

Measurement tools are used in many manufacturing processes to monitor the thickness and uniformity of deposited or etched thin films. For example, optical interference techniques are commonly used to monitor insulating films, while resistive techniques are generally employed to monitor conductive films.

Resistive techniques are destructive in nature, for example the 4-point probe process uses probes having sharp points to measure the resistance of a deposited or etched film, and therefore cannot be used to measure production samples. Such resistive techniques are used to calculate film thickness based upon the assumed resistivity of the film. However, the thin film resistivity is not necessarily related to the bulk film value, nor is such correlation easily predictable.

Eddy current tools may also be used to monitor conductive films. See, for example W. Rodgers, *Thin Film Thickness Measuring Apparatus Using An Unbalanced Inductive Bridge*, U.S. Pat. No. 3,878,457 (15 Apr. 1973); and W., Smoot, *Resonant Frequency Measuring Device For Gauging Coating Thickness*, U.S Pat. No. 4,005,359 (25 Jan. 1977). While eddy current techniques are not destructive, such techniques have other disadvantages with patterned production samples. For example, eddy current techniques are sensitive to pattern shapes and thus produce differing results for films having similar resistivities but different topographies.

It is common in the semiconductor industry to use a balance to monitor the average thickness of metal films, for example tungsten films that are deposited using low pressure chemical vapor deposition ("LPCVD"). A balance is also employed to monitor the thickness of epitaxial silicon deposition processes. Knowledge of the sample area and the film density are necessary to convert mass measurements made using a balance to an average thickness measurement. These variables are relatively straightforward to predict.

A time delayed differential weighing procedure may be used to calculate the change in mass of a sample after it has been processed. Such processing may involve adding material to or removing material from a sample, and may require a significant amount of time, e.g. more than 15 minutes, to complete. Examples of relevant processes include deposition, etching, plating and corroding.

An important aspect of the invention is to provide a weighing procedure in which maximum precision and accuracy is achieved. A time delayed differential weighing is a more complex weighing procedure than a simple differential measurement. This additional complexity is a result of compensating for changes in environmental conditions between the two times the measurements are executed, i.e. before and after sample processing. For example, changes in temperature and air density, i.e. buoyancy, give rise to errors that would not occur if the second measurement was made immediately following the first measurement, as is the case with a simple differential measurement.

There are various extrinsic sources of error when weighing a sample. These errors increase in number and relevance as the reproducibility requirements of the process become more restrictive. For example, as described above, a time delayed differential measurement is subject to error because the environmental conditions are not the same at the time the two measurements are made, i.e. temperature and air density vary over time. Additionally, a differential measurement is subject to an intrinsic error relating to the difference calculation. The magnitude of this error may be on the order of 1.41 times greater than the error of either component, which is the typical error associated with adding or subtracting two values, where each value has an error component. Calculating the change in mass also introduces an error related to converting the first reading to what it would be at the temperature and air density at the time of the second reading. Human errors, referred to as appraiser variation (i.e. a quantitative measure of the reproducibility), are also introduced when the various measurements are made. Another common source of error that results in poor balance reproducibility is introduced when a balance is used after being dormant for a number of hours, i.e. the balance may produce slightly different readings as it "warms up."

Temperature and air density errors should not be ignored when using a four or five place balance (i.e. a balance that measures in grams to four or five digits to the right of the decimal point respectively) because the mass of the substrate greatly exceeds the mass of the etched or deposited film. Once the substrate errors are minimized, temperature and air density thin film errors may be ignored when using a four place balance, if desired, because the intrinsic reproducibility of the balance is not significantly eroded by these errors, although the balance must be periodically calibrated. On the other hand, the superior precision of a five place balance is degraded by ignoring these thin film error sources. Additionally, the dormancy error also significantly degrades all types of electronic analytical balance measurements.

Air density, temperature, balance reading, and dormancy errors are now examined.

The weight of a sample measured in air differs from the weight of the sample when measured in a vacuum by an amount proportional to the quantity of displaced air. This buoyancy phenomenon was first explained by Archimedes. In the various applications for which a differential weighing procedure is used, a long time may elapse between the first weighing of the sample before the sample is processed, and a second weighing of the sample after sample processing, e.g. 15 minutes to more than one day. During this processing interval, there are typically changes in the air density and temperature.

Modern electronic analytical balances only partially compensate for the air density related error because the density of the sample, and to a much lesser extent the etched or deposited film, almost always differ from the density of the internal calibration weights in the balance. Thus, the standard calibration procedure cannot completely compensate for changes in air density because the sample density is not identical to that of the internal calibration weights, which are typically made of an iron alloy having a density of about 8.0 $g/cm^3$.

The actual mass of the sample also differs from the balance reading because of temperature related errors. There is generally a 1–2 PPM/°C. error relating to the balance electronics. For example, the largest component of the error for electromagnetic force compensation balances is the change in the magnetic field of the electromagnet due to temperature variation. It is necessary to quantify the magnitude of the temperature related error by examining the temperature calibration procedure capabilities of electronic analytical balances.

Manual balance operation relies on a balance operator to record a displayed stable balance result. Depending on the balance parameters that are chosen, this value can vary significantly from one operator to another. For example, one operator might record the result immediately after stability is indicated, while another operator might wait for five additional seconds before recording the result. A lack of operator concentration can also produce a variation in this waiting period.

When a balance is used after being dormant for a number of hours, the operator usually "warms up" the balance by loading and unloading a sample numerous times before the actual measurements are recorded. The dormancy phenomenon is thought to be the result of static frictional forces acting on the balance weighing mechanism. However, the exact mechanism that gives rise to the dormancy phenomenon is not entirely understood, and there is thus no consensus at this time on the cause of this problem. One problem with this sequence of steps is the potential for significant appraiser variation, i.e. different operators may not perform the balance warm up procedure adequately or the same way.

The known time delayed differential weighing technique involves calibrating the balance immediately preceding both sets of measurements to compensate for temperature variations. The weighing procedure also requires the measurement of the temperature, pressure, and relative humidity to calculate the air density at the time of each set of measurements to compensate for changes in air density. The known procedure is also subject to various appraiser errors that can produce inconsistent results.

It would therefore be a significant contribution to the art to develop an improved weighing procedure, including associated hardware, that minimizes many of the problems associated with loading a sample onto a standard electronic analytical balance, and with using such balance to make a time delayed differential measurement.

SUMMARY OF THE INVENTION

The invention provides a time delayed differential weighing procedure that is used with an electronic analytical balance, and that is optimized for samples exhibiting a small change in mass, for example from deposition, etching, plating or corroding, relative to the sample mass. A typical application of the invention is the time delayed differential weighing of a thin film deposited onto a silicon wafer.

The weighing procedure involves a time delayed differential measurement using a sensitive electronic analytical balance. The procedure minimizes all significant sources of error that could otherwise degrade the measurement results. The weighing procedure compensates for temperature and air density errors relating to the substrate to avoid degrading the reproducibility of the balance, which is quantitatively represented by the standard deviation. The weighing procedure also adjusts the balance readings to compensate for air density and temperature errors for any known thin film.

The weighing procedure compensates for errors resulting from air density and temperature changes that occur during the interval between the first measurement of a sample, before the sample is processed; and a subsequent measurement of the sample, after the sample is processed. The weighing procedure uses a calibration substrate, and therefore does not require before and after temperature, pressure, and relative humidity measurements. The balance only requires periodic calibration, and calibration is not required immediately preceding each measurement. Additionally, errors associated with balance dormancy are also addressed and minimized.

The time delayed differential weighing procedure uses a calibration standard having substantially the same density as that of the sample. The same calibration standard must be used for both sample weightings. In the exemplary automated balance tool, which is primarily intended for weighing flat substrates, the calibration standard is housed with the balance and is programmed to be robotically loaded, weighed, and unloaded with each group of samples.

The calibration standard is weighed both times the sample is weighed, i.e. before and after processing. Because the calibration standard matches the density of the sample, it tracks the change in the sample balance reading due to air density and temperature changes, and thus minimizes substrate related errors. The result is a rapid, reliable and practical measurement procedure requiring a minimum amount of hardware. For example temperature, pressure, and relative humidity sensors are not required.

The invention also includes an automated procedure which, unlike manual balance operation, is capable of performing a measurement while minimizing the appraiser variation. The weighing procedure reduces or eliminates such appraiser variation by requiring a specific number of identical readings after balance stability is achieved. In the preferred embodiment of the invention, ten identical readings in a row must be obtained after stability is achieved before a final balance reading is stored or recorded. The exemplary balance typically transmits 2.5 stable readings per second to a computer. This procedure makes the balance insensitive to appraiser variation. The number of required identical readings can be changed to suit the reproducibility requirements of the process that is being monitored.

The invention includes a computer that precisely determines and stores the stable balance results. The computer also executes commands through a computer interface to automatically load and unload the internal calibration weights a predetermined number of times for specific lengths of time to precondition the balance before every measurement. All other balance commands are also accessible through this interface. This feature of the invention simplifies the operation of the balance.

The advantages of a preconditioning sequence include the elimination of any appraiser variation. The advantage of using internal weights is that internal weights are insensitive to changes in the actual sample masses. Automating these balance functions makes the preconditioning sequence simple and repeatable. By automating the balance, the preconditioning sequence, which takes more than one minute, can be concurrent with other steps, thereby improving the throughput of the balance.

The invention also provides a procedure for determining the precision and accuracy of an automated balance by allowing automated or operator initiated execution of a gauge study. The gauge study involves first weighing a calibration standard; and then weighing a set of samples to produce a first set of values that correspond to sample mass. A predetermined interval is allowed to elapse and the calibration standard is reweighed to produce an adjustment factor that compensates for changes in temperature and/or air density. The set of samples is also reweighed at this time to produce a second set of values that correspond to sample mass. The two sets of values are used to derive any of the following: changes between said first and second sets of measured values due to appraiser variation, changes between said first and second set of measured values due to equipment variation, and total change between said first and second set of measured values based upon equipment repeatability and reproducibility.

A process for determining the exposed area of a flat substrate, such as a semiconductor wafer, having a photoresist coating that is exposed after photoresist developing is also disclosed herein. A weighing procedure is employed in which a first series of differential measurements are made to produce a value that corresponds to photoresist mass. These measurements may be made by weighing the substrate before and after the photoresist coating is applied to the substrate; or by using optical techniques. The substrate is then exposed and processed, and a second differential measurement corresponding to remaining photoresist mass is made. The two values obtained for photoresist mass are divided to obtain a fraction that may be used to determine either the surface area of the wafer that is still coated by photoresist, and/or the surface area of the wafer that is exposed.

DETAILED DESCRIPTION OF THE INVENTION

The invention provides a rapid, reliable, and practical time delayed differential weighing procedure that is useful for measuring a relatively small change in the mass of a large sample. The accuracy and precision of the method is predominantly dependent on the standard deviation of the electronic analytical balance. The weighing procedure of the invention minimizes the errors associated with changes in air density and variations in temperature for both the massive substrate and the much lighter etched or deposited film.

Figure 1:
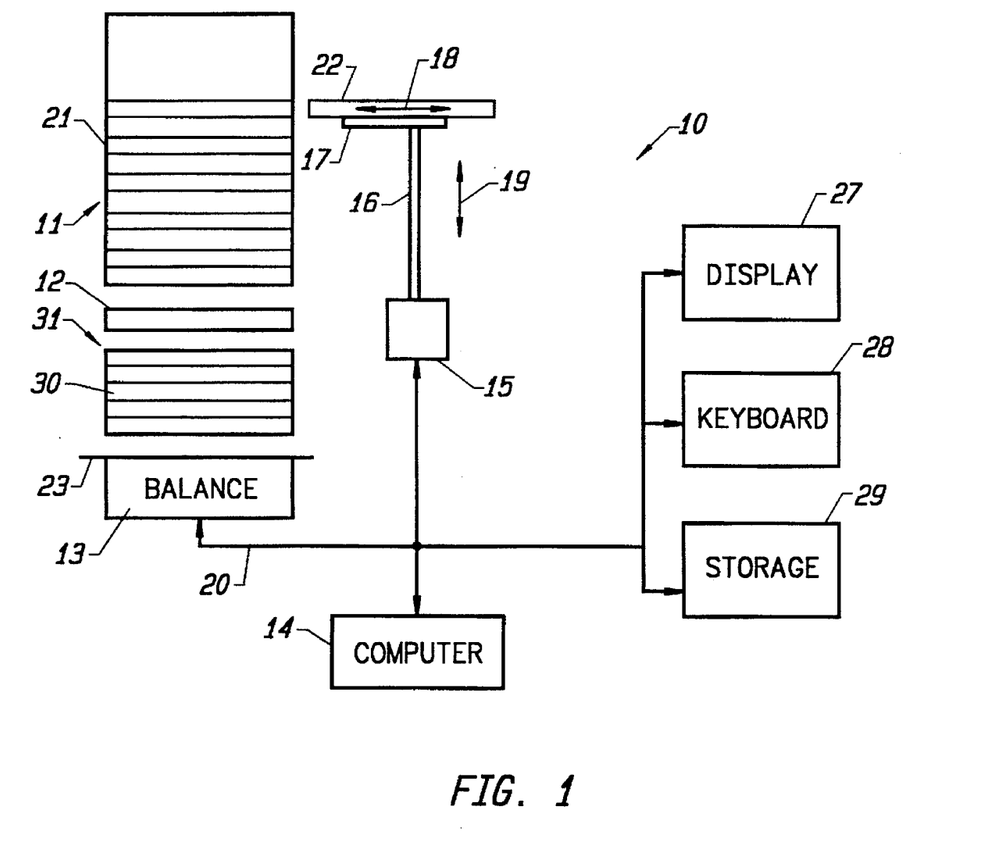
FIG. 1 is a block schematic diagram of an apparatus for time delayed differential weighing to monitor the thickness and uniformity of deposited or etched thin films according to the invention.

FIG. 1 is a block schematic diagram of an apparatus 10 for time delayed differential weighing to monitor the thickness and uniformity of deposited or etched thin films according to the present invention. In the figure, a cassette 11 containing several semiconductor wafers 21 is shown positioned proximate to a balance 13 having a sample loading surface 23. Because electronic balances are well known, the details of the balance are not discussed in detail herein.

The invention includes a robot assembly that includes an electronic interface 15; an indexer 16, operable as shown by the line having numeric designator 19 to raise and lower a robot arm 17; and the robot arm itself which is operable, as shown by the line having numeric designator 18, to load and unload wafers between the cassette 11 and the balance 13. In the figure, a wafer 22 is shown in the process of being loaded between the cassette 11 and the balance 13.

The invention also includes a calibration standard 12 that is weighed before and after each wafer or cassette of wafers is weighed, i.e. before and after wafer processing. The calibration standard may also be weighed after the first (and/or second) measurements are made, prior to (and after) processing. In this way a weighted average may be obtained for a group of sample measurements to compensate for environmental changes that occur while the first and/or second measurements are made for a group of wafers. Additionally, the calibration standard may be weighed several times during a series of measurements, and the measurements made for the calibration standards may be used to interpolate the calibration standard for each sample measurement. For maximum precision, the calibration standard may be weighed before and after the weighing of each wafer in a group of wafers.

The calibration standard is chosen to have a density similar to that of the wafers that are to be weighed. It should be appreciated that, although the invention is discussed in connection with the weighing of semiconductor wafers, it is also possible to use the invention to perform many other precision weighing operations. For example, the weighing procedure of the invention may be used to measure the amount of pollutants collected by an air filter, etc.

The invention also includes a computer 14 that is connected to the balance 13, indexer 15 by an electronic bus 20. The computer may also be connected to a display 27, keyboard 28, storage device 29, etc.

Figure 2:
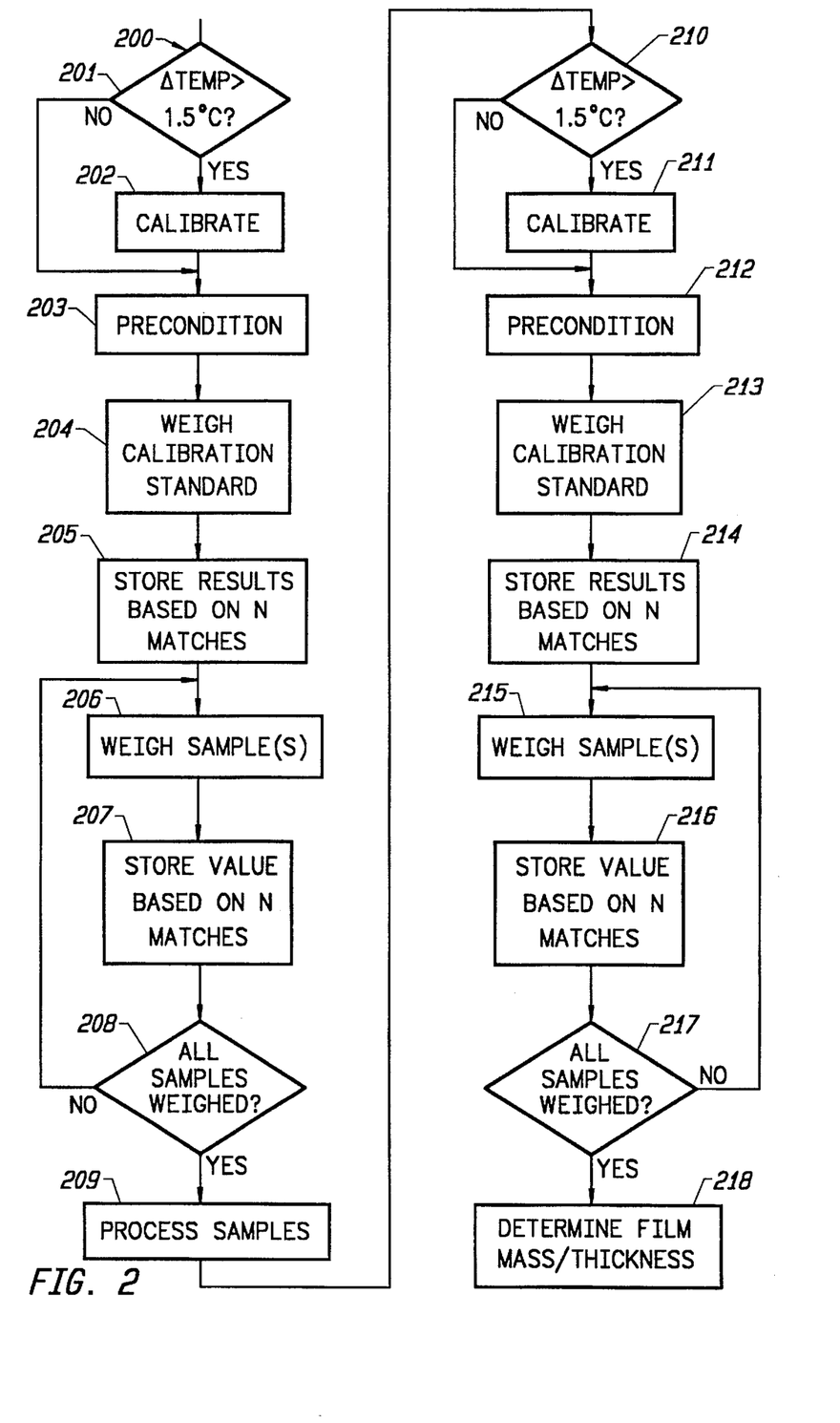
FIG. 2 is a flow diagram showing an exemplary weighing procedure according to the invention.

FIG. 2 is a flow diagram showing an exemplary weighing procedure according to the present invention. The automated weighing procedure precisely determines and stores the balance results.

A weighing session is commenced (200). At any time a temperature change of more than 1.5° C. is detected (201), an automatic calibration procedure is selected (202). A balance precondition procedure is also initiated (203) to "warm up" the balance. In some embodiments of the invention, it is not necessary to precondition the balance or calibrate the balance for temperature changes during a weighing session.

The first step in the weighing procedure is to weigh a calibration standard (204) that is of similar density to that of the sample(s) to be weighed. Once the calibration standard is weighed, the measurement obtained for the standard (205) is stored and the samples are then weighed (206). Typically, a cassette of several wafers or other samples may be measured before processing. The values obtained for the initial sample weighings are stored (207). Such stored values may be chosen based upon several readings. In this way, the weighing procedure of the invention avoids the possibility of inaccurately recorded results by minimizing appraiser variation, i.e. taking several reading automatically avoids the possibility that inconsistent procedures are followed by different operators when manually recording balance readings.

After all of the samples are weighed (208), the samples may be processed (209). If a temperature change of more than 1.5° C. is detected (210), the automatic calibration procedure is selected again (211). A balance precondition procedure is also initiated (212) to "warm up" the balance.

During the processing interval, it is likely that changes may occur in balance temperature and air density. Such changes can affect the accuracy and precision of the readings obtained with a precision balance. The invention provides a procedure that minimizes the effect of such changes in temperature and air density by reweighing the calibration standard (213) after the samples have been processed, and immediately before the samples are reweighed. The results obtained are stored 214.

By reweighing the calibration standard, an adjustment to the first sample reading is obtained based upon the change in weight exhibited by the calibration standard between the first, preprocessing weighing and the second, post-processing weighing. Because the calibration standard itself was not processed, its mass has not changed. However, since temperature and/or air density may have changed during the processing interval, the measured change in weight of the calibration standard may be used to derive the adjustment value that is then used to adjust the values obtained when the samples are weighed (215).

As the samples are weighed a second time (215), the values are stored based upon a predetermined number of readings for each sample (216). Once all samples are weighed (217), the film mass/thickness per sample is calculated (218). From this value, a sample film thickness may also be calculated.

The weighing procedure can use the average value of the air density to calculate the correction factor. It is therefore not necessary to make repeated temperature, pressure and relative humidity measurements. Additionally, it is not necessary to calibrate the balance, which is a time consuming step, immediately preceding measurements.

Errors relating to balance dormancy are also diminished by automatically loading and unloading the internal calibration weights to precondition the balance. In the preferred embodiment of the invention, the internal calibration weights are loaded and unloaded six times. Each of the weights is allowed to remain loaded for an interval of 10 seconds and unloaded for an interval of 10 seconds. These procedures minimize the appraiser variation and make the pre-conditioning sequence independent of sample mass. If the balance tool is automated, pre-conditioning can be concurrent with other steps improving the throughput.

Various requirements must be met when using the weighing procedure of the invention.

First, the density of the standard calibration substrate should be the same as the sample. Typical flat substrate samples have multiple layers of patterned films on the top surface with densities different from those of the sample substrate. Typically, the average sample density is extremely close to that of the sample substrate because the thickness of the substrate is more than two orders of magnitude greater than the total thickness of all of the films. In some applications it is helpful if the calibration substrate is a facsimile of the sample substrates, for example by having a similar film configuration. The calibration substrate may even be a sample specifically designated as a calibration substrate.

Second, the balance should be calibrated at regular intervals to minimize temperature related errors. This is accomplished by using the automatic calibration capability of most modern balances or by periodically calibrating the balance when the deviation from the previous calibration temperature is more than about 1.5° C.

Third, when flat substrates are measured, the calculated mass measurement can be converted to an average thickness measurement by dividing the calculated mass measurement by the substrate area and the film density. The precision of the mass measurement is superior to the precision of the calculated average thickness due to additional errors associated with the assumed area and density values. The mass measurement is a precise measurement, however caution must be used when stating the precision of the average thickness value.

The following variables are used to derive a formula to determine the mass of the etched or deposited film based upon the measurement values:

RS1: first balance reading of sample
RS2: second balance reading of sample
RC1: first balance reading of calibration standard
RC2: second balance reading of calibration standard
f: average correction factor
f2: correction factor during the second weighing
a: density of air
dcal: density of internal calibration weight (8 g/cm$^3$)
df: density of film
T: temperature when balance reading is made
Tcal: temperature when calibration was performed If the first balance reading (RS1) is multiplied by the ratio of the calibration standard readings (RC2/RC1), the first reading is converted to what it would be at the temperature and air density of the second readings. Subtracting this value from the second reading (RS2), yields the balance reading of the added or removed film as if the measurements were both made at the same temperature and air density:

$$\text{film reading} = RS2 - (RS1 * RC2/RC1) \quad (1)$$

This procedure minimizes any errors due to changes in air density or temperature. The use of a calibration sample or substrate improves the precision to close to that of a normal differential weighing procedure where both measurements are made over a very small period of time. This special procedure is necessary because the mass of the substrate greatly exceeds the change in mass after processing, and also because the densities of the substrate and film usually differ from that of the internal iron alloy calibration weights used by balance manufacturers.

The procedure may also be used to calculate a film reading value based upon the difference between the first balance reading of the sample (RS1) and the second balance reading of the sample (RS2), where the RS2 value is first multiplied by the ratio of the first calibration standard reading to the second calibration standard reading.

EXAMPLE 1

Assume a substrate mass of 60 g (the mass of an 8-inch silicon wafer), a range of 0.06 mg/cm$^3$ for the air density, a range of 3° C. for the temperature and a 1.5 PPM/°C. temperature related error. The possible span in balance readings can be estimated using these values:

$$\text{substrate volume} = \text{mass/density} = (60 \text{ g})/(2.33 \text{ g/cm}^3) = 25.8 \text{ cm}^3;$$

$$\text{buoyancy error} = (\Delta \text{air density}) * (\text{substrate volume}) \quad (2)$$

$$\text{buoyancy error} = (0.06 \text{ mg/cm}^3) * (25.8 \text{ cm}^3)$$

$$\text{buoyancy error} = 1.55 \text{ mg}$$

$$\text{temperature error} = (\Delta \text{temperature}) * (\text{temperature related error}) * (\text{substrate mass}) \quad (3)$$

$$\text{temperature error} = (3° \text{ C.}) * (1.5 \text{ PPM/°C.}) * (60 \text{ g})$$

$$\text{temperature error} = 0.27 \text{ mg}$$

Both of these errors are significantly larger than the standard deviation of a four or five place balance (0.1 mg or 0.02 mg respectively). Therefore, if the precision of the weighing procedure is to approach the intrinsic balance precision, it is necessary to compensate for air density and temperature related sample errors.

It has been found that, for measurements of thin films, sample errors have been greatly reduced by using this prescribed procedure. When using a five place balance, the film reading must still be multiplied by a correction factor to yield a value for the film mass that compensates for air density and temperature errors that may affect the etched or deposited film. This correction factor (f or f2) is made up of an air density component as well as a temperature component:

$$\text{film mass} = f * \text{film reading} \quad (4)$$

$$\text{film mass} = f2 * [RS2 - (RS1 * RC2/RC1)] \quad (5)$$

A practical example of the weighing procedure is provided to illustrate the requirements for making a sufficiently precise and accurate calculation of the film mass. Mass calculation errors that are significant compared to the electronic analytical balance standard deviation cannot be introduced during the weighing procedure, if the intrinsic precision of the balance is not to be compromised. The following examines the components of the correction factor and the variation in the correction factor as a function of realistic variations in air density and temperature.

EXAMPLE 2

The correction factor is made up of two terms, an air density correction factor and a temperature dependent correction factor (the following formula assumes a 1.5 PPM/°C. temperature error):

$$f = [(1 - a/dcal)/(1 - a/df)] * [1 + (T - Tcal) * 0.0000015] \quad (6)$$

The air density correction factor is calculated from the air density, the internal calibration weight density and the film density. A formula for calculating the density of air is described in *Weighing The Right Way With Mettler Toledo. The Proper Way To Work With Electronic Analytical and Microbalances*, Mettler-Toledo AG (February 1993) as follows:

$$a = (0.348444 * p - (0.00252 * t - 0.020582) * h)/(273.15 + t) \quad (7)$$

where:

a=air density (kg/m³ or mg/cm³)

p=atmospheric pressure (hPa or mbar)

h=relative humidity (%)

t=temperature (°C.)

To calculate a worst case variation in the air density correction factor, assume a change in temperature, pressure, and relative humidity such that both an air density minimum and an air density maximum are considered. For purposes of this Example, also assume that the ambient temperature increases from 18° C. to 22° C., that the air pressure increases from 1000 mbar to 1030 mbar and that the relative humidity increases from 20% to 60%. The average air density therefore is calculated by applying equation (7) above as follows:

| LOW PRESSURE | HIGH PRESSURE |
|---|---|
| t = 22° C. | t = 18° C. |
| p = 1000 mbar | p = 1030 mbar |
| h = 60% | h = 20% |

$$a(low) = [(0.348444 * 1000 - (0.00252 * 22 - 0.020582) * 60] / (273.15 + 22)$$

$$a(low) = 1.1735 \text{ mg/cm}^3$$

$$a(high) = [(0.348444 * 1030 - (0.00252 * 18 - 0.020582) * 20] / (273.15 + 18)$$

$$a(high) = 1.2310 \text{ mg/cm}^3$$

a(average)=1.20225 mg/cm³ (average value of air density)

The air density component of the correction factor may then be calculated for a tungsten film ( which has a density of 16 g/cm³) at the average air density and at the air density at the time of the second weighing. A tungsten film was chosen for this Example because it has a greater mass than most other films due to its large density:

$$f = (1 - 1.20225/8000)/(1 - 1.20225/16000)$$

$$f = 0.99992485 \text{ (average correction factor)}$$

$$f2 = (1 - 1.2310/8000)/(1 - 1.2310/16000)$$

$$f2 = 0.99992306 \text{ (second weighing correction factor)}$$

The following is an example of the error introduced when the air density correction factor is not used, and when the average correction factor is used instead of the correction factor at the time of the second weighing. For this Example, assume a tungsten film reading of 0.5 g (i.e. 1 micron of tungsten on an 8-inch diameter substrate).

The error associated with not using the air density correction factor is:

$$\text{error} = 0.5 - (0.99992485) * 0.5$$

$$\text{error} = 0.0376 \text{ mg}$$

This is the residual error. The calibration procedure of the balance has already compensated for a fraction of the air density error. The balance reading is greater than the actual mass for this Example because the density of the film is greater than the density of the internal calibration weights. This error is relatively insignificant when compared to the standard deviation of a four place balance (0.1 mg), but still significant when compared to that of a five place balance (0.02 mg) for this specific film.

The film mass using the correction factor at the time of the second weighing is:

$$\text{film mass} = 0.99992306 * 0.5 = 0.49996153 \text{ g}$$

The approximate mass using the average correction factor is:

$$\text{approximate film mass} = 0.99992485 * 0.5 = 0.49996243 \text{ g}$$

The difference between these two masses is the error associated with using an approximate air density correction factor. The error can add or subtract from the exact value since the air density can increase or decrease from the first reading to the second reading. This error, +/−0.0009 mg is small compared to the five place balance standard deviation (0.02 mg) so it can be ignored.

Films with densities closer to the internal calibration weight density exhibit a relatively smaller variation in the correction factor with changes in air density. Those films having densities significantly less than that of the balance internal calibration weight exaggerate this error because the film displaces much more air. This does not create a particular problem because such films are also lighter.

EXAMPLE 3

The following analysis considers a film having a density less than that of the internal calibration weights, e.g. a 1.4 micron thick silicon film (density=2.33 g/cm³) on an 8-inch substrate. For this Example, assume a film reading of 0.1 g.

The exact air density correction factor (using an air density of 1.2310 mg/cm³) is:

$$f2=(1-1.2310/8000)/(1-1.2310/2330)$$

$$f2=1.00037465$$

The approximate air density correction factor is calculated using an air density of 1.20225 mg/cm³:

$$f=(1-1.20225/8000)/(1-1.20225/2330)$$

$$f=1.00036589$$

The error from ignoring air density effects is:

$$error=(1.00036589)*0.1-0.1$$

$$error=0.03659 \text{ mg}$$

Once again, this error is insignificant if a four place balance is used, but the error is significant when a five place balance is used. For this Example, the balance reading is less than the actual mass because the film density is less than the internal calibration weight density.

The film mass is calculated with the exact and approximate air density correction factors:

$$\text{film mass}=1.00037465*0.1=0.10003747 \text{ g}$$

$$\text{approximate film mass}=1.00036589*0.1=0.10003659 \text{ g}$$

The difference between these two values is the error associated with using the approximate air density factor for a silicon film. This error (+/−0.0009 mg) is as small as the error associated with a tungsten film (discussed above), and it can also be ignored.

Relatively large spreads in temperature, pressure, and relative humidity were used in the Examples above to generate the maximum and minimum air density correction factors. Realistic values in a semiconductor fabrication facility typically exhibit less variation, further decreasing the magnitude of this error. Thus, it is preferred to use an average air density correction factor when practicing the invention. If the change in mass from processing is significantly increased, the air density related error increases proportionally. Each specific application needs to be carefully analyzed to estimate the magnitude of the air density related error, and an appropriate correction factor may then be determined.

If an electronic analytical balance with an automatic calibration capability is used, a calibration procedure is initiated whenever a 1.5° C. change in temperature is detected. In such case, the maximum error that is encountered by not calibrating the balance immediately preceding measurement and just allowing automatic calibration to occur is:

$$(1.5 \text{ ppm/°C.})*(3° \text{ C.})=4.5 \text{ PPM}$$

The extreme temperature correction factors are 1.0 +/−0.00000225. This correction factor only affects an etched or deposited film because substrate errors are minimized by using the calibration standard substrate. Assuming a maximum film mass of 0.5 g (1 micron of tungsten on an 8-inch substrate), there is a resulting error of +/−0.001 mg, which is much smaller than that of a five place balance standard deviation (0.02 mg). Therefore, ignoring residual temperature related errors does not degrade the balance standard deviation.

Thus, the correction factor need only be composed of the air density term, and the temperature term can be ignored. Thus, the weighing procedure described herein does not require calibration immediately preceding each group of measurements. The only requirement to minimize temperature related errors is that the autocalibration capability of the balance be activated whenever a 1.5° C. change in temperature is detected, typically only a few times a day. Alternatively, the balance may be manually calibrated whenever a 1.5° C. change in temperature is detected.

The throughput of a tool using this weighing procedure is significantly improved if it is not necessary to calibrate the balance preceding each group of measurements. This is especially important with an automated balance tool. However, in some applications involving substrates having more massive films, a larger temperature related error may be present that could possibly require balance calibration preceding each set of measurements.

The weighing procedure also reduces or eliminates the appraiser variation by requiring a specific number of identical readings after balance stability is achieved. In the preferred embodiment of the invention, the balance must obtain ten identical readings in a row after stability is achieved before indicating a final balance reading. The exemplary balance typically transmits 2.5 stable readings per second to a computer. This procedure makes the balance insensitive to appraiser variation. The number of required identical readings can be changed to suit the reproducibility requirements.

The invention also provides a weighing procedure that executes commands through a computer interface to automatically load and unload the internal calibration weights a number of times for specific lengths of time to precondition the balance. All other balance commands are also accessible through this interface. This feature of the invention simplifies the operation of the automated balance.

The advantages of a preconditioning sequence also include the elimination of any appraiser variation and insensitivity to changes in the actual sample masses. By automating these balance functions, the preconditioning sequence is made simple and repeatable. By automating the balance, the preconditioning sequence, which typically takes more than one minute, can be concurrent with other steps, thereby improving the throughput of the balance.

Procedure To Calculate Area Exposed By Photoresist Develop Step

The following is a description of a procedure that may use any weighing apparatus, for example an automated balance, to calculate the exposed area of a substrate. The process may be practiced with any measurement apparatus, such as the balance shown in FIG. 1.

Figure 3:
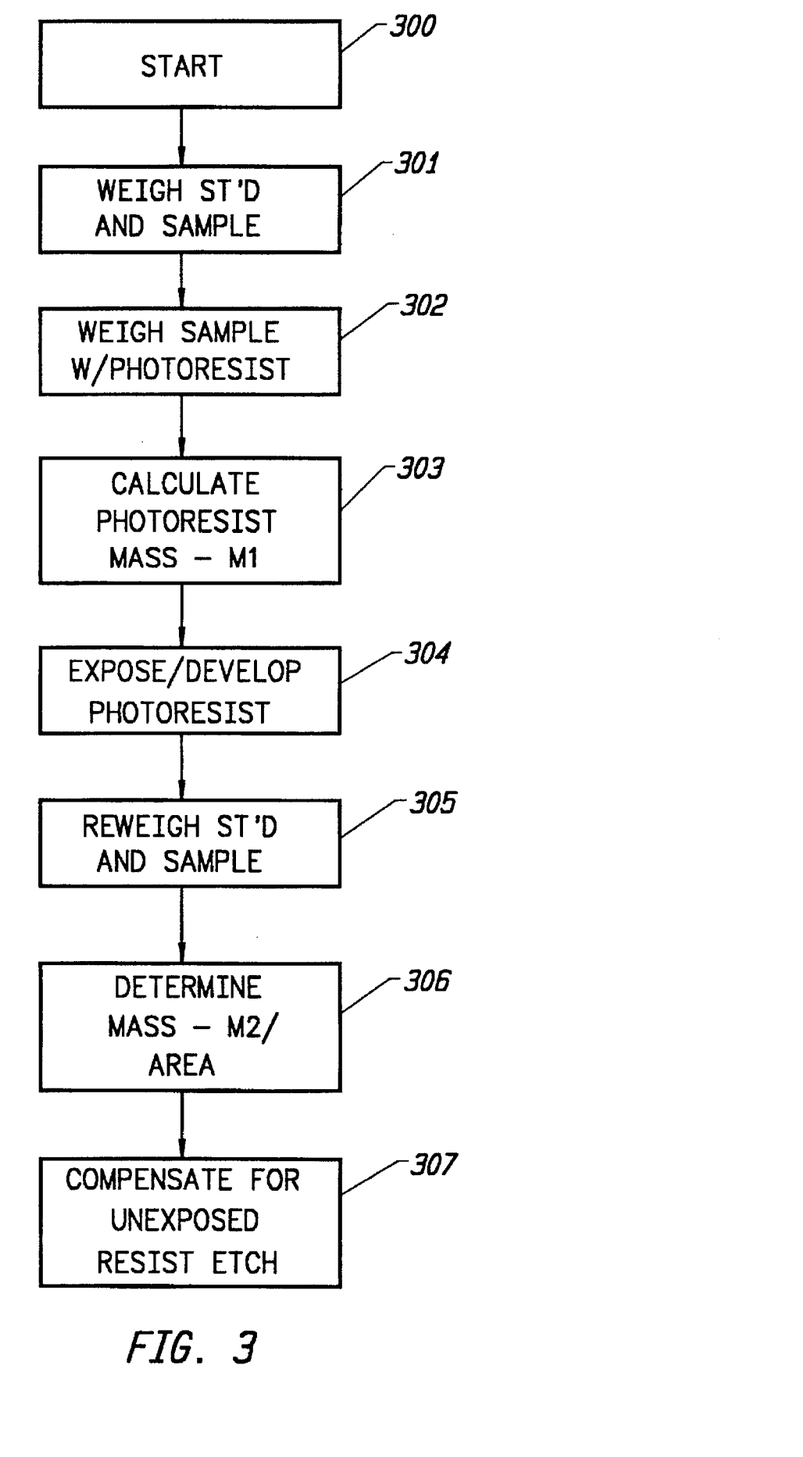
FIG. 3 is a flow diagram showing an exemplary procedure for determining the surface area of a wafer that is exposed after photoresist develop step according to the invention.

FIG. 3 is a flow diagram showing an exemplary procedure for determining the surface area of a wafer that is exposed after photoresist develop step according to the invention. In the figure, when the procedure begins (300) a calibration standard and at least one sample is weighed (301). The sample is coated with photoresist and the sample and standard are reweighed (302). The differential readings obtained for the sample, i.e. the before and after photoresist coating measurements, are used to calculate a value that corresponds to the mass of photoresist M1 on the sample surface (303). If desired or necessary, the values obtained may be adjusted to compensate for air density and/or temperature.

Alternatively, the mass of the photoresist may be determined using optical techniques. In such procedure, the thickness of the photoresist layer is determined using an optical tool. The thickness value is then multiplied by the area of the wafer and a value corresponding to the density of the photoresist. The resulting value corresponds to the mass of the photoresist layer M1.

The sample is then exposed and the photoresist is developed (304). After processing, the sample is reweighed (305) to produce a value that correspond to the mass of photoresist M2 remaining on the sample surface (306). From these two values (M1 and M2), the amount of surface area covered and/or exposed may be determined (307). If desired, the value thus obtained may be adjusted to compensate for photoresist that was unexposed but nonetheless was etched during the developing process (307).

EXAMPLE 4

This example quantifies the precision of the technique. A photolithographic process is used to mark the area to be cleared and to mark the area to be left covered by resist. Assume that a differential balance and procedure having a differential precision of 0.15 mg is used. The photoresist density is approximately 1.1 g/cm$^3$. The area of a 6-inch wafer is 176 cm$^2$ and that of an 8-inch wafer is 314 cm$^2$.

First, the precision-to-tolerance ("P/T") ratio is calculated for the resist layer. For purposes of this example, a resist thickness of 10000Å having a tolerance of +/−5% or 1000Å is used. The precision mass values, converted to thickness for 6-inch and 8-inch wafers are:

Six-inch wafer:
thickness=mass/(area*density)
thickness=0.00015/(176*1.1)
thickness=77.5Å
P/T=77.5/1000
P/T=0.0775 or 7.75%
Eight-inch wafer:
thickness=0.00015/(314*1.1)
thickness=43Å
P/T=43.4/1000
P/T=0.0434 or 4.34%

These values are significantly less than the 20% maximum P/T ratio typically permitted. Unfortunately, there is usually no need to measure photoresist thickness in this thickness range using an automated balance.

It may be necessary to determine the fraction of the wafer surface that is exposed after the photoresist develop step. An automated balance procedure can be used to perform this function, for example employing the balance 23 of FIG. 1 to perform any measurements that need be made, as well as the microprocessor 14 shown in the figure to perform any calculations that need be made. This measurement may be useful to an etch engineer, for example when studying loading effects.

One important application for the procedure described herein is to determine the amount of exposed area for a selective deposition process, i.e. selective metal electrodeposition. It is necessary to know the amount of exposed area when calculating the current density to be used during deposition. The procedure initially determines the mass of the photoresist using a standard technique that includes air density compensation. After exposure and develop, the sample is weighed again to determine the mass of the remaining photoresist. The value of the second mass measurement is divided by that of the first mass measurement to determine the fraction of the surface still covered by resist. A small correction can be made for the unexposed photoresist etch rate in the develop solution.

It is also possible to make a sample calculation and predict the error associated with this technique. For purposes of the example, a 6-inch wafer having 10000Å of photoresist, exhibiting a 1% loss in photoresist during the develop step, and where 90% of the resist is developed is used. Then, photoresist mass=thickness*area*density  (8)

photoresist mass=(0.0001)*176*1.1 photoresist mass=0.01936 g=19.36 mg mass after develop=0.1*19.36*0.99 mass after develop=1.917 mg fraction covered by resist=1.917/(19.36*0.99)

fraction covered by resist=0.10 percentage covered by resist=10%

If the differential precision is divided by the photoresist mass, a crude estimate of the error associated with this calculation can be determined as follows:

error=0.15/19.36=0.00775 or +/−0.39% for a 6-inch wafer error=0.15/34.54=0.00434 or +/−0.22% for an 8-inch wafer As with the balance thickness calculation (discussed above), the error is constant and is not proportional to the fraction of the wafer covered by resist. The error expressed as percent is equal to the percent of the wafer surface covered by resist, not a percentage of the average value. The example can be expressed as 10.0% +/−0.4%. The percent of the surface covered by resist is between 9.6% and 10.4%. Therefore, if the calculation above yielded 50%, the range would be 49.6% to 50.4%.

Gauge Study Capability

The accuracy and precision of instruments that are used to collect data are subject to variation. Therefore, a machine or process capability study cannot be meaningful unless the measuring instrument used to measure the response variable possess both accuracy and precision. The confidence in the results that are obtained from a machine or process capability study is increased by performing a repeatability and reproducibility ("R&R" or "gauge") study. Such a study is performed to: a) quantify the ability of the measuring instrument to reproduce the same results when different operators measure the same unit (appraiser variation); and b) quantify the ability of the instrument to obtain the same results when a unit is measured more than once ("equipment variation").

Repeatability is defined as the amount of variation obtained when measuring the same unit, defined as precision, with the measuring equipment. Reproducibility is defined as the variation obtained in the average of measurements made by various operators measuring the same unit. The results of these measurements may be used to produce a value that is the measure of all the combined errors, and that is referred to as the differential R&R.

The differential R&R value indicates the uncertainty of the measurements made by the equipment in comparison with the tolerance of the equipment. Thus, a smaller differential R&R value is an indication of a better measuring instrument. If a study of the instrument produces a high differential R&R, then the instrument is either in need of repair or recalibration, or is of a lower quality.

Most measurement equipment is manufactured to exhibit a specified level of precision and accuracy that may be determined with the use of a calibration standard. For example, when determining the precision and accuracy of an optical interference measurement tool, a sample having a known amount of oxide on top of silicon can be used to quantify the performance of the tool. The performance of a balance can also be quantified by using a calibration weight, provided the air and sample densities are also known. One aspect of the invention quantifies the performance of a time delayed differential weighing procedure that uses a balance, without the need of using an external calibration weight.

If a sample is measured without adding or removing a film from the sample surface, the calculated change in mass should be equal to zero, that is its mass is unchanged. Any deviation from this value is a measure of the accuracy and precision of the measuring tool. Thus, in accordance with the invention, a gauge study based on the measurement of unprocessed wafers is employed to predict the accuracy and precision of a balance that is used to make a time delayed differential measurement. The result of the gauge study reflects the intrinsic performance of the balance, as well as the ability of the weighing procedure to compensate for changes in temperature and air density. This aspect of the invention allows an operator to make a quantitative measurement of how well the measurement tool is performing.

In the exemplary embodiment of the invention, the gauge study is executed one time a day, although the procedure may be executed whenever it is deemed appropriate, i.e. more or less frequently. Please refer to FIG. 1 for the following discussion of the invention. Five gauge study wafers 30 are housed with the balance 10 proximate to the calibration standard wafer 12. The balance includes a section 31 directly under the place where the sample cassette 11 is loaded that holds six wafers—one calibration standard wafer 12, and five gauge study wafers 30. Each of the six wafers must have substantially the same density for a proper gauge study. In other embodiments of the invention, more or fewer wafers may be used for the gauge study.

When a gauge study is executed (e.g. by operator control or as part of an automated procedure), the calibration standard wafer and the five gauge study wafers 30 are weighed on the balance. After a predetermined interval, each of the measurements is repeated. The procedure produces two measurements for each of the six wafer that are time-delayed to simulate a predetermined processing interval. The raw data thus obtained are used to calculate various values that indicate the precision and accuracy of the measuring tool.

Figure 4:
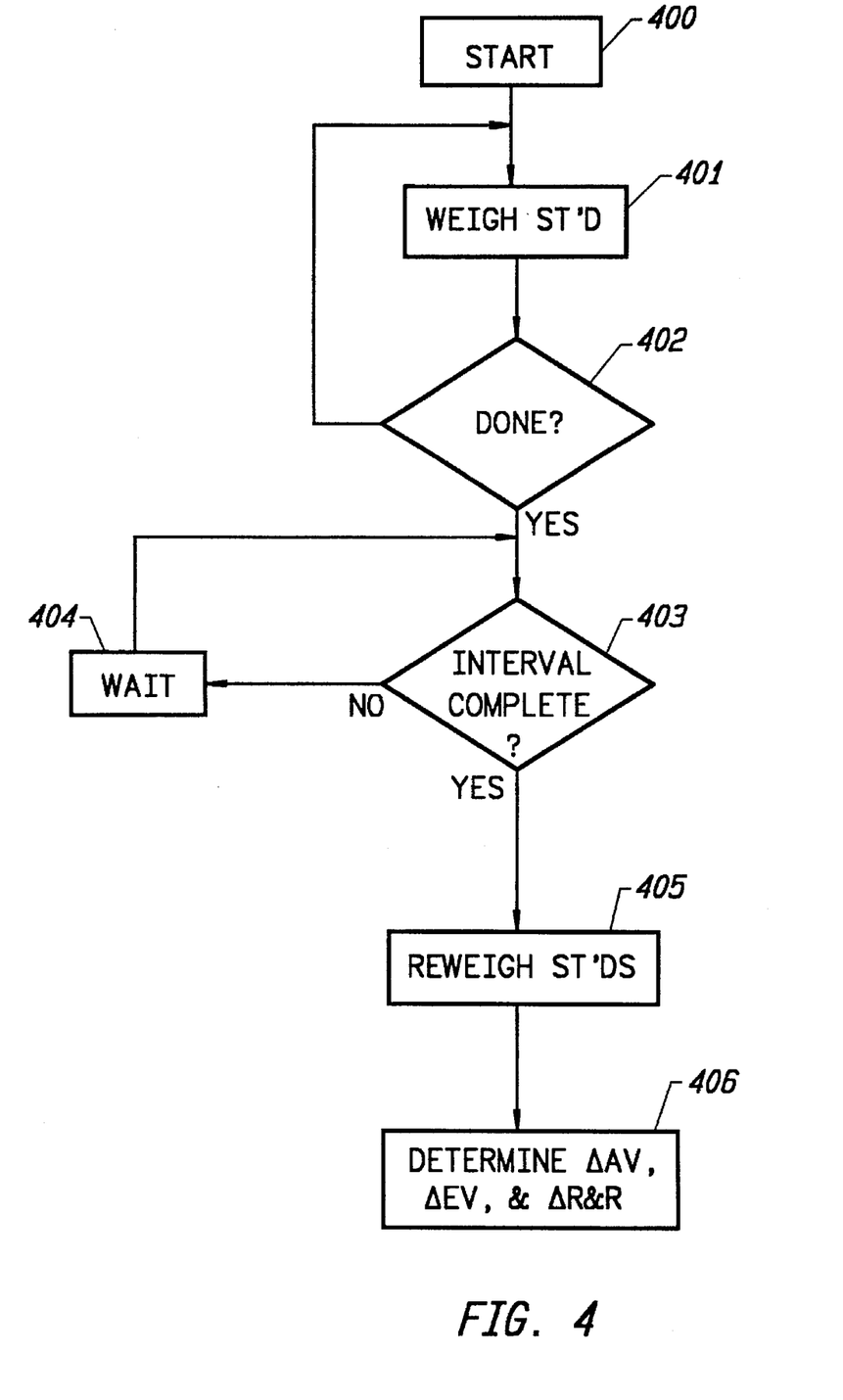
FIG. 4 is a flow diagram showing an exemplary procedure for performing a gauge study according to the invention.

FIG. 4 is a flow diagram showing an exemplary procedure for performing a gauge study according to the invention. In the figure, when the procedure is commenced (400), a series of measurements are made in which at least one calibration standard and a plurality of gauge substrates are weighed (401, 402). After a first set of measurements is completed, a predetermined interval is allowed to elapse (403, 404) and the calibration standard and gauge substrates are then reweighed (405, 406). The raw data thus obtained are used to calculate a differential appraiser variation, a differential equipment variation, and a total differential repeatability and reproducibility measurement (407).

EXAMPLE 5

Various parameters are chosen for the gauge study. These parameters are based on the desired degree of precision and accuracy of the gauge study, as well as the amount of time required to complete a gauge study. For this Example, the following choices were made:

the number of samples=5=n;

the number of trials=2=r; and the number of operators=2.

The measurement procedure minimizes the influence of different operators on the measurement results. This reduces the appraiser variation to an insignificant value. A gauge study is designed to quantify this appraiser variation. One set of data ("trial" data) is assigned to the first operator and another set of data is assigned to another operator. If there is some influence on the measurement results by these different sets of data, the appraiser variation is significant. One assumption made in a gauge study is that the machine operator does not influence the results obtained.

In the exemplary gauge study procedure, the order of the samples is not changed from one set of measurements to another. In the actual measurement procedure, the order of the before and after measurement is the same. This is acceptable because the differential weighing procedure is somewhat immune to the tendency of the measurements to change with the order of the samples.

One variable that is included in the gauge study is the choice of delay time. This parameter is included to simulate temperature and air density changes that can occur between the before and after measurements. This allows the gauge study results to reflect the influences of temperature and buoyancy errors.

The compromises that are made with this gauge study should be taken into account when judging the results of this study. The preferred application for this procedure is to quantify the performance of the automated balance to determine if it is in a unstable state.

The following is a list of the sequence of measurements and the calculations based on these measurements.

A set of measurements consists of weighing the calibration standard, weighing the five gauge samples and then weighing the calibration standard again.

The calculated masses use the following procedure. The weighted averages of the calibration standard reading are used along with the before and after weighing to calculate the film reading. Since there was no added or removed film, the correction factor is not used. The calculated mass is assumed to be the calculated film reading. The range is the magnitude of the difference between the calculated mass of the two trials for each sample. This generates ten ranges. The five ranges for each operator are averaged to generate two average ranges. These two averages are averaged to yield the average range. The ten readings for each operator are averaged. The magnitude of the difference between the two operator averages is then calculated.

MEASUREMENTS operator A, first trial, before measurements operator B, first trial, before measurements delay operator B, first trial, after measurements operator A, first trial, after measurements operator B, second trial, before measurements operator A, second trial before measurements delay operator A, second trial, after measurement operator B, second trial, after measurements

CALCULATIONS calculate the film masses of the five samples for the two operators and the two trials, i.e. 20 masses total calculate the five ranges for operator A and the five ranges for operator B calculate the average range for each operator $\overline{R_A}$, $\overline{R_B}$ calculate the average of the two average ranges $\overline{R}$ calculate the average of the ten readings for each operator calculate the magnitude of the difference between the two operator averages $|\overline{X_A} - \overline{X_B}|$ calculate the differential equipment variability ("EV")

calculate the differential appraiser variability ("AV")

calculate the differential repeatability and reproducibility ("R&R")

$$\text{diff } EV = \bar{R}(.867)(6) \text{ (mg)} \tag{9}$$

$$\text{diff } AV = \sqrt{[|\overline{X_A} - \overline{X_B}|(.709)(6)]^2 - \frac{(\text{diff } EV)^2}{nr}} \text{ (mg)} \tag{10}$$

(if quantity in large brackets is less than zero, diff $AV = 0$)

$$\text{diff } R + R = \sqrt{(\text{diff } EV)^2 + (\text{diff } AV)^2} \text{ (mg)} \tag{11}$$

It is contemplated that the gauge study may be carried out in any of several sequences. For example, more or fewer operators may be used for the procedure; the number of readings may be increased or decreased; the number of intervals between weighings and the number of weighings may be increased or decreased, etc.

It should be appreciated that the various embodiments of the invention find application in any process that involves a time delayed differential measurement, i.e. where processing must take a significant amount of time, e.g. more than 15 minutes. In such processes, the time delay allows a change in air density that requires an air density correction before a second measurement may be made. Various software products are already available from balance manufacturers and independent companies for performing simple differential measurements. The specific application would dictate the weighing procedure. The mass of the sample and the change in mass of the sample after processing determines the required weighing complexity, the balance precision and the accuracy of the air density calculation.

Accordingly, additional applications for the invention include: measuring the wear loss of moving parts due to friction; measuring weight gain due to oxidation; measuring weight loss due to sublimation; measuring weight gain due to water absorption or adsorption; measuring weight loss due to water or solvent evaporation; measuring weight change due to corrosion; measuring weight gain due to plating; measuring weight gain due to painting; measuring weight gain due to other deposition processing; and measuring weight loss due to etching. The invention also finds applications in the following flat substrate applications: silicon substrate processing; compound semiconductor substrate processing; magnetic head disk processing; and flat panel display processing. Such, flat substrate applications for the invention include: measuring substrate thickness; film deposition, including:

Ipcvd tungsten
Ipcvd metals (titanium nitride)
Ipcvd amorphous silicon
epitaxial silicon
epitaxial compound semiconductors
sputtered metals
evaporated metals
plated metals
selectively plated metals
spin on glass
backside deposition
dielectric films on difficult underlayers, such as:
  polymers, oxides or nitrides on metals
  polymers, oxides or nitrides on polysilicon
  polymers, oxides or nitrides on silicide
  dielectric deposition on a similar underlayer
thick dielectric films (100 micron photoresist)
films with questionable dielectric constants
thermal nitridation of titanium
thermal oxidation of silicon
anodization of aluminum
oxygen implantation to form buried oxide layer;
and film etching, including:
tungsten plug etchback
composite deposition/etchback plug process
blanket metal or silicon etch
plasma etchback dielectric planarization
composite deposition/etchback planarization process
chemical/mechanical polishing of silicon dioxide
chemical/mechanical polishing of metals
silicon dioxide spacer etchback
backside etch
silicon micromachining.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

I claim:

1. A time delayed differential weighing process, comprising the steps of:

weighing at least one sample with a balance before sample processing to obtain a first value corresponding to sample mass;

weighing a calibration standard of substantially the same density as said sample at substantially the same time as the sample is weighed before said sample processing to obtain a first value corresponding to calibration standard mass;

reweighing said sample after sample processing to obtain a second value corresponding to sample mass;

reweighing said calibration standard at substantially the same time as the sample is weighed after sample processing to obtain a second value corresponding to calibration standard mass; and compensating for temperature and air density changes during a sample processing interval by comparing calibration standard mass values obtained before and after sample processing to eliminate temperature and air density errors.

2. The method of claim 1, further comprising the step of:
   automatically calibrating said balance when about a 1.5° C. temperature change is detected.

3. The method of claim 1, further comprising the step of:
   waiting for a predetermined number of identical readings after balance stability is achieved before recording a balance result.

4. The method of claim 1, further comprising the step of:

loading and unloading an internal balance calibration weight a predetermined number of times of selected duration to precondition said balance and compensate for balance dormancy.

5. The method of claim 1, further comprising the step of:

converting a calculated mass measurement for a flat sample having a film formed thereon to an average sample thickness value by dividing said sample mass measurement by a sample area value and a sample density value.

6. The method of claim 1, wherein said compensating step further comprises:

determining a value representing change in sample weight by calculating the difference between the second sample mass value and the first sample mass value, where the first sample mass value is first multiplied by an adjustment factor expressed as the ratio of the second calibration standard mass value to the first calibration standard mass value.

7. The method of claim 6, further comprising the steps of:

calibrating said balance with an internal balance calibration weight; and determining film mass for a sample comprising a flat substrate having a thin film formed thereon by multiplying said value representing change in sample weight by an average correction factor f derived according to the following:

$$f=[(1-a/dcal)/(1-a/df)]*[1+(T-Tcal)*Terr];$$

where:

a=density of air;

dcal=density of an internal balance calibration weight;

df=density of said film;

T=temperature when a balance reading is made;

Tcal=temperature when calibration is performed; and

Terr=temperature error.

8. The method of claim 1, wherein said calibration standard is weighed at least twice at such times as a series of sample measurements is being performed.

9. A time delayed differential weighing apparatus, comprising:

a balance for weighing at least one sample to obtain first and second values corresponding to sample mass before and after sample processing, respectively;

a calibration standard of substantially the same density as said sample, wherein said calibration standard is weighed at substantially the same time as said sample before said sample processing to obtain a first value corresponding to calibration standard mass, and wherein said calibration standard is reweighed at substantially the same time as said sample after sample processing to obtain a second value corresponding to calibration standard mass; and means for compensating for temperature and air density changes during a sample processing interval by comparing calibration standard mass values obtained before and after sample processing to derive a temperature and air density adjustment value.

10. The apparatus of claim 9, further comprising:

means for automatically calibrating said balance when about a 1.5° C. temperature change is detected.

11. The apparatus of claim 9, further comprising:

a counter adapted to detect a predetermined number of identical readings after balance stability is achieved before recording a balance result.

12. The apparatus of claim 9, further comprising:

means for loading and unloading an internal balance calibration weight a predetermined number of times of selected duration to precondition said balance and compensate for balance dormancy.

13. The apparatus of claim 9, further comprising:

means for converting a calculated mass measurement for a flat sample having a film formed thereon to an average sample thickness value by dividing said sample mass measurement by a sample area value and a sample density value.

14. The apparatus of claim 9, wherein said means for compensating further comprises:

means for determining a value representing change in sample weight by calculating the difference between the second sample mass value and the first sample mass value, where the first sample mass value is multiplied by an adjustment factor expressed as the ratio of the second calibration standard mass value to the first calibration standard mass value.

15. The apparatus of claim 14, further comprising:

at least one internal balance calibration weight for calibrating said balance; and means for determining film mass for a sample comprising a flat substrate having a thin film formed thereon by multiplying said value representing change in sample weight by an average correction factor f derived according to the following:

$$f=[(1-a/dcal)/(1-a/df)]*[1+(T-Tcal)*Terr];$$

where:

a=density of air;

dcal=density of an internal balance calibration weight;

df=density of said film;

T=temperature when a balance reading is made;

Tcal=temperature when calibration is performed; and

Terr=temperature error.

16. The apparatus of claim 9, wherein said calibration standard is weighed at least twice at such times as a series of sample measurements is being performed.

* * * * *